US011262757B2

(12) United States Patent
Jang et al.

(10) Patent No.: US 11,262,757 B2
(45) Date of Patent: Mar. 1, 2022

(54) AUTONOMOUS DRIVING APPARATUS AND METHOD FOR AUTONOMOUS DRIVING OF A VEHICLE

(71) Applicant: SAMSUNG ELECTRONICS CO., LTD., Suwon-si (KR)

(72) Inventors: Seowoo Jang, Suwon-si (KR); Unkyu Park, Suwon-si (KR); Daehyun Ban, Suwon-si (KR); Seongwon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 16/241,083

(22) Filed: Jan. 7, 2019

(65) Prior Publication Data

US 2019/0212736 A1 Jul. 11, 2019

(30) Foreign Application Priority Data

Jan. 9, 2018 (KR) .................. 10-2018-0002921

(51) Int. Cl.
*G05D 1/00* (2006.01)
*G05D 1/02* (2020.01)
*B60W 30/00* (2006.01)

(52) U.S. Cl.
CPC .......... *G05D 1/0088* (2013.01); *B60W 30/00* (2013.01); *G05D 1/0212* (2013.01); *G05D 1/0274* (2013.01); *G05D 2201/0213* (2013.01)

(58) Field of Classification Search
CPC .. G05D 1/0088; G05D 1/0212; G05D 1/0274; G05D 2201/0213; B60W 30/00
See application file for complete search history.

(56) References Cited

U.S. PATENT DOCUMENTS 7,693,624 B2  4/2010  Duggan et al.
9,063,543 B2  6/2015  An et al.
(Continued)

FOREIGN PATENT DOCUMENTS

EP   3 330 825 A1   6/2018
JP   2017-507398    3/2017
(Continued)

OTHER PUBLICATIONS

International Search Report and Written Opinion dated Apr. 5, 2019, issued in International Application No. PCT/KR2019/000199.
(Continued)

*Primary Examiner* — Hussein Elchanti
(74) *Attorney, Agent, or Firm* — Nixon & Vanderhye P.C.

(57) ABSTRACT

Disclosed are an autonomous driving apparatus for performing autonomous driving of a vehicle and a controlling method thereof. An autonomous driving apparatus according to an example aspect of the present disclosure includes a sensor configured to acquire sensing information to determine a driving state of the vehicle; a storage configured to store a plurality of autonomous driving models; and at least one processor configured to perform autonomous driving of the vehicle using one of the plurality of autonomous driving models stored in the storage based on sensing information sensed by the sensor. Accordingly, the autonomous driving apparatus is capable of performing autonomous driving of a vehicle by rapidly changing a driving mode to an autonomous driving mode suitable for an event occurring during autonomous driving of the vehicle.

13 Claims, 11 Drawing Sheets

(56) References Cited

U.S. PATENT DOCUMENTS

| | | |
|---|---|---|
| 9,511,779 B2 | 12/2016 | Cullinane et al. |
| 2007/0179735 A1* | 8/2007 | Fiedler .................. B60T 8/885 |
| | | 702/150 |
| 2014/0005871 A1* | 1/2014 | Saito .................. B60L 15/2036 |
| | | 701/22 |
| 2014/0244096 A1 | 8/2014 | An et al. |
| 2016/0068103 A1 | 3/2016 | McNew et al. |
| 2016/0082953 A1 | 3/2016 | Teller et al. |
| 2016/0355192 A1 | 12/2016 | James et al. |
| 2016/0357186 A1 | 12/2016 | Dias |
| 2017/0166203 A1* | 6/2017 | Sugai .................. B60K 7/0007 |
| 2017/0234689 A1 | 8/2017 | Gibson et al. |
| 2017/0313304 A1* | 11/2017 | Shiraishi .............. B60W 10/20 |
| 2017/0369052 A1* | 12/2017 | Nagy .................. B60W 30/14 |
| 2018/0203451 A1 | 7/2018 | Cronin et al. |
| 2018/0216958 A1 | 8/2018 | Park |
| 2019/0196503 A1* | 6/2019 | Abari .................... G06Q 10/00 |
| 2019/0347879 A1* | 11/2019 | Motomura ................ B60R 1/00 |
| 2020/0164888 A1* | 5/2020 | Hiramatsu ............ B60W 40/02 |

FOREIGN PATENT DOCUMENTS

| | | |
|---|---|---|
| KR | 10-1204720 | 11/2012 |
| KR | 10-2017-0010645 | 2/2017 |
| KR | 10-2017-0015214 | 2/2017 |
| KR | 10-1736306 | 5/2017 |
| WO | 2015/103374 | 7/2015 |

OTHER PUBLICATIONS

European Extended Search Report dated Sep. 22, 2020 for EP Application No. 19739056.0.
European Examination Report dated Jun. 16, 2021 for EP Application No. 19739056.0.
Korean Office Action dated Oct. 18, 2021 for KR Application No. 10-2018-0002921.

* cited by examiner

AUTONOMOUS DRIVING APPARATUS AND METHOD FOR AUTONOMOUS DRIVING OF A VEHICLE

CROSS-REFERENCE TO RELATED APPLICATION

This application is based on and claims priority under 35 U.S.C. § 119 to Korean Patent Application No. 10-2018-0002921, filed on Jan. 9, 2018, in the Korean Intellectual Property Office, the disclosure of which is incorporated by reference herein in its entirety.

BACKGROUND

1. Field

The present disclosure relates to an autonomous driving apparatus for autonomous driving of a vehicle and a controlling method thereof.

2. Description of Related Art

Amid rising interest in autonomous driving of vehicles, there are a lot of research and development of related technologies.

Specifically, an autonomous driving apparatus mounted in a vehicle collects information on a surrounding environment and state information of the vehicle, applies the collected information to a predetermined autonomous driving model, and conducts autonomous driving of the vehicle according to an application result.

While a vehicle is performing autonomous driving, an event according to surrounding environment such as a traffic accident, loss of roads, unexpected occurrence of an obstacle and so on, or an event according to internal environment such as an error in autonomous driving system or a defect of a vehicle may occur.

When the aforementioned various events occur, an autonomous driving apparatus that performs autonomous driving of a vehicle using the autonomous driving model learned to be suitable for an ordinary autonomous driving situation may not be rapidly changed to an autonomous driving model corresponding to the events and cannot perform autonomous driving of a vehicle.

Accordingly, when autonomous driving of a vehicle is performed through a conventional autonomous driving apparatus, a driver of the vehicle is exposed to an accident risk due to the various events as described above.

SUMMARY

Example embodiments may address the above disadvantages and other disadvantages not described above.

The present disclosure addresses the above-mentioned need, and an example aspect of the present disclosure is to allow a vehicle to autonomously drive safely.

It is another aspect of the present disclosure to perform autonomous driving of a vehicle by rapidly changing a driving mode to an autonomous driving mode suitable for an event occurring during autonomous driving of the vehicle.

An autonomous driving apparatus for performing autonomous driving of a vehicle according to an example embodiment includes a sensor configured to acquire sensing information to determine a driving state of the vehicle; a storage configured to store a plurality of autonomous driving models; and at least one processor configured to perform autonomous driving of the vehicle using one of the plurality of autonomous driving models stored in the storage based on sensing information sensed by the sensor.

The plurality of autonomous driving models may include a first autonomous driving model which is learned to autonomously drive in a normal driving status and at least one second autonomous driving model which is learned to autonomously drive in response to each of event situations.

The at least one processor may, when it is determined that an event occurs based on sensing information sensed through the sensor while autonomous driving of the vehicle is being performing using the first autonomous driving model, be configured to perform autonomous driving of the vehicle using one model corresponding to the event from among the at least one second autonomous driving models.

The at least one processor may include a first processor configured to perform autonomous driving of the vehicle using the first autonomous driving model; and a second processor configured to, when an event occurs based on sensing information sensed by the sensor while the vehicle performs autonomous driving by the first processor, perform autonomous driving of the vehicle using one model corresponding to the event from among the at least one second autonomous driving models.

The first processor may, when it is determined that the vehicle drives in a normal driving state by analyzing sensing information sensed by the sensor, while the vehicle performs autonomous driving by the second processor, perform autonomous driving of the vehicle using the first autonomous driving model.

The first processor may, when it is determined that another event which is different from the event occurs by analyzing sensing information sensed by the sensor, while the vehicle performs autonomous driving by the second processor, perform autonomous driving of the vehicle using one model corresponding to the another event from among the at least one second autonomous driving model.

The at least one processor may be implemented as a number of processors corresponding to the plurality of autonomous driving models.

The sensing information may include state information of the vehicle and state information related to a road on which the vehicle is driving.

The autonomous driving apparatus further includes an outputter comprising output circuitry, and the at least one processor may, based on an autonomous driving model being changed, control the outputter to output a message to guide change of the autonomous driving mode.

According to another example embodiment, a controlling method of an autonomous driving apparatus of a vehicle may include acquiring sensing information to determine a driving state of the vehicle; acquiring one model from among a plurality of prestored autonomous driving models based on sensing information sensed by the sensor; and performing autonomous driving of the vehicle using the acquired autonomous driving models by the at least one processor.

The plurality of autonomous driving models may include a first autonomous driving model which is learned to autonomously drive in a normal driving status and at least one second autonomous driving model which is learned to autonomously drive in response to each of event situations.

The performing autonomous driving may include, when it is determined that an event occurs based on sensing information sensed by the sensor while autonomous driving of the vehicle is being performing using the first autonomous driving model, performing autonomous driving of the vehicle using one model corresponding to the event from among the at least one second autonomous driving models.

The performing autonomous driving may include performing autonomous driving of the vehicle using the first autonomous driving model; and when an event occurs based on sensing information sensed by the sensor while the vehicle performs autonomous driving by the first processor, performing autonomous driving of the vehicle using one model corresponding to the event from among the at least one second autonomous driving models.

The performing autonomous driving may include, when it is determined that the vehicle drives in a normal driving state by analyzing sensing information sensed by the sensor, while the vehicle performs autonomous driving by the second processor, performing autonomous driving of the vehicle using the first autonomous driving model by the first processor.

The performing autonomous driving may include, when it is determined that another event which is different from the event occurs by analyzing sensing information sensed by the sensor, while the vehicle performs autonomous driving by the second processor, performing autonomous driving of the vehicle using one model corresponding to the another event from among the at least one second autonomous driving model.

The at least one processor may be implemented as a number of processors corresponding to the plurality of autonomous driving models.

The sensing information may include state information of the vehicle and state information related to a road on which the vehicle is driving.

The method may further include, based on an autonomous driving model being changed, outputting a message to guide change of the autonomous driving mode.

As described above, according to the present disclosure, an autonomous driving apparatus may perform autonomous driving of a vehicle by rapidly changing a driving mode to an autonomous driving mode which is suitable to an event that occurs while autonomous driving of the vehicle is being performed.

BRIEF DESCRIPTION OF THE DRAWINGS

The above and/or other aspects, features and advantages of certain embodiments of the present disclosure will be more apparent from the following description, taken in conjunction with the accompanying drawings, in which.

DETAILED DESCRIPTION

Figure 1:
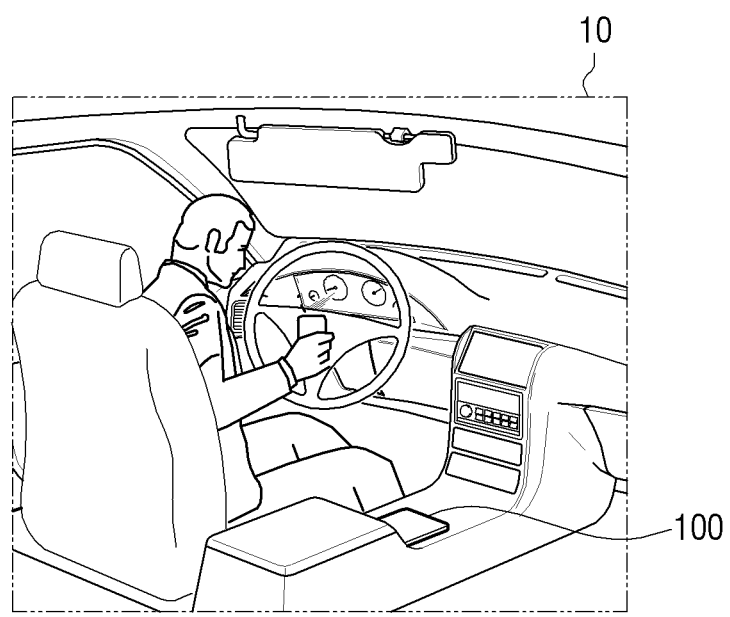
FIG. 1 is a diagram illustrating an example view of autonomous driving of a vehicle according to an example embodiment.

Hereinafter, various example embodiments will be described in greater detail with reference to the accompanying drawings.

The example embodiments of the present disclosure may be diversely modified. Accordingly, various example embodiments are illustrated in the drawings and are described in greater detail in the disclosure. However, it is to be understood that the present disclosure is not limited to any specific example embodiment, but includes all modifications, equivalents, and substitutions without departing from the scope and spirit of the present disclosure. Also, well-known functions or constructions may not described in detail where they would obscure the disclosure with unnecessary detail.

In the following description, the same reference numerals are used for the same elements, even in different drawings. The matters defined in the disclosure, such as detailed construction and elements, are provided to assist in a comprehensive understanding of the example embodiments. Thus, it is apparent that the example embodiments can be carried out without those specifically defined matters. Also, functions or elements known in the related art may not be described in detail where they would obscure the example embodiments with unnecessary detail.

The terms used herein are selected from the general terms that are widely used at present and in consideration of the functions in the present disclosure, but at the same time, the terms may vary depending on the intent of those skilled in the art or the precedents, or by the emergence of new technologies. Further, certain terms may be arbitrarily chosen, in which case the corresponding meaning will be described in the disclosure. Accordingly, the terms used herein will be defined not simply based on the names of the terms, but based on the meanings of the terms and the context throughout the disclosure.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

In the example embodiments of the present disclosure, a 'module' or a 'unit' may perform at least one function or operation, and be implemented as hardware (e.g., circuitry) or software, or as any combination of hardware and software. Further, except for the 'module' or the 'unit' that has to be implemented as particular hardware (e.g., a dedicated processor), a plurality of 'modules' or a plurality of 'units' may be integrated into at least one module and implemented as at least one processor (not illustrated).

Hereinafter, example embodiments of the present disclosure will be described in greater detail with reference to the accompanying drawings so that those skilled in the art can easily carry out the present disclosure. However, the present disclosure may be embodied in many different forms and is not limited to the embodiments described herein.

FIG. 1 is a diagram illustrating example autonomous driving of a vehicle according to an example embodiment.

As illustrated in FIG. 1, the vehicle 10 may perform autonomous driving to a destination requested by a user according to a control command of an autonomous driving apparatus 100.

For example, the autonomous driving apparatus 100 may obtain at least one of prestored map information, destination information, a state of the vehicle 10, and the sensing information of the surrounding environment. Thereafter, the autonomous driving apparatus 100 applies the obtained information to the learned autonomous driving model, and carries out the autonomous driving of the vehicle 10 based on the result of the processing.

The autonomous driving model used for autonomous driving of the vehicle 10 can be learned (e.g., by machine learning, artificial intelligence techniques, etc.) for each driving situation, and a plurality of autonomous driving models learned for each of the driving situations can be registered in the autonomous driving apparatus 100.

According to an embodiment, the autonomous driving model may include a first autonomous driving model that is learned to autonomously drive in a normal driving situation, and at least one second autonomous driving model that is learned to autonomously drive in response to each of various events (situations).

The event situation may be, for example, a rainy or snowy weather event situation, an event situation in which an abnormality occurs to the vehicle 10 or a driver, a system error related event situation in the autonomous driving apparatus 100, and an event situation in which a traffic accident occurs, and the like, but is not limited thereto.

By selecting one of a pre-learned plurality of autonomous driving models based on pre-obtained information and applying the pre-obtained information to the selected autonomous driving model, the autonomous driving apparatus 100 may perform autonomous driving of the vehicle 10 from a result of processing.

For example, the autonomous driving apparatus 100 may apply the pre-obtained information to the first autonomous driving model from among a plurality of autonomous driving models, and performs autonomous driving of the vehicle 10 on the basis of the result of the processing.

The autonomous driving apparatus 100 analyzes the information obtained during the autonomous driving based on the first autonomous driving model, and determines whether the aforementioned at least one event has occurred.

As a result of determination, if it is determined that an event has occurred, the autonomous driving apparatus 100 selects a second autonomous driving model that is learned to autonomously drive in response to the determined event. Thereafter, the autonomous driving apparatus 100 applies the pre-obtained information to the selected second autonomous driving model and performs the autonomous driving of the vehicle 10 based on the result of the processing.

As such, the autonomous driving apparatus 100 according to the present disclosure may perform autonomous driving using the autonomous driving model which is learned to perform autonomous driving in response to a predetermined event situation, from among a plurality of autonomous driving models, and perform autonomous driving of the vehicle 10 adaptively when an event occurs.

Figure 2:
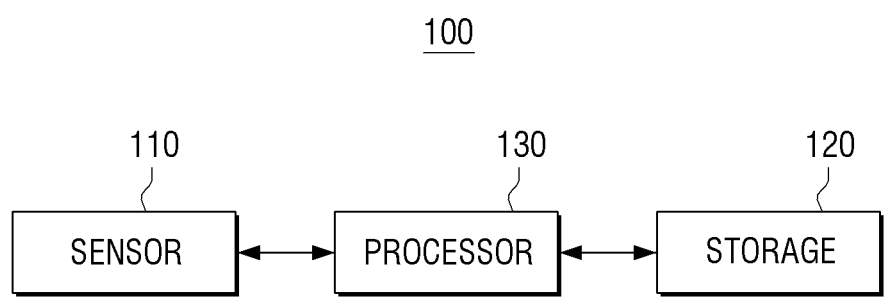
FIG. 2 is a block diagram illustrating an example autonomous driving apparatus according to an example embodiment.

FIG. 2 is a block diagram illustrating an example autonomous driving apparatus according to an example embodiment.

As illustrated in FIG. 2, the autonomous driving apparatus 100 includes a sensor 110, a storage 120, and a processor (e.g., including processing circuitry) 130.

The sensor 110 acquires various sensing information for determining the driving state of the vehicle 10. The sensing information may, for example, and without limitation, include state information of the vehicle 10 and state information related to the road on which the vehicle 10 is driving.

The state information of the vehicle 10 may, for example, and without limitation, include air pressure information, vibration intensity information, acceleration information, photographing information, infrared sensing information, position information of the vehicle 10, or the like.

In addition, the state information of the vehicle 10 may include system information of the autonomous driving vehicle 100 to control the vehicle 10 to autonomously drive. The system information may include, for example, and without limitation, processing speed information of the processor 130 that controls the vehicle 10 to autonomously drive, booting information, and the like.

The state information related to the road on which the vehicle 10 is driving may include, for example, and without limitation, accident detection information between the vehicles 10, road information, weather information, or the like.

The storage 120 stores a plurality of autonomous driving models for autonomous driving of the vehicle 10. The plurality of autonomous driving models may include a first autonomous driving model that is learned to autonomously drive in a normal driving situation and at least one second autonomous driving model that is learned to autonomously drive in response to each of the event situations.

The processor 130 may include various processing circuitry and controls the overall operation of each of the components of the autonomous driving apparatus 100. The processor 130 performs autonomous driving of the vehicle 10 using at least one of a plurality of autonomous driving models stored in the storage 120.

For example, the processor 130 performs autonomous driving of the vehicle 10 using one of a plurality of autonomous driving models stored in the storage 120 based on the sensing information sensed by the sensor 110.

However, the present disclosure is not limited thereto, and the processor 130 may perform autonomous driving of the vehicle 10 using one of a plurality of autonomous driving models stored in the storage 120 based not only on the sensed information sensed by the sensor 110 but also information on, for example, and without limitation, an adjacent vehicle 10, a traffic management server (not shown) managing road traffic, a meteorological administration server (not shown), and the like.

The processor 130 may perform autonomous driving of the vehicle 10 using example embodiments as shown below.

When the processor 130 is a single unit, the processor 130 may determine whether or not an event occurred based on sensing information which is sensed by the sensor 110 while the autonomous driving of the vehicle 10 is conducted using the first autonomous driving model.

As a result of the determination, if it is determined that an event has occurred, autonomous driving of the vehicle 10 can be performed using one of the at least one second autonomic driving model corresponding to the determined event.

When a plurality of processors 130 are provided, a first processor 130-1 (see, e.g., FIGS. 4 and 5) of the plurality of processors 130 can perform autonomous driving of the vehicle 10 using the first autonomous driving model.

Figure 4:
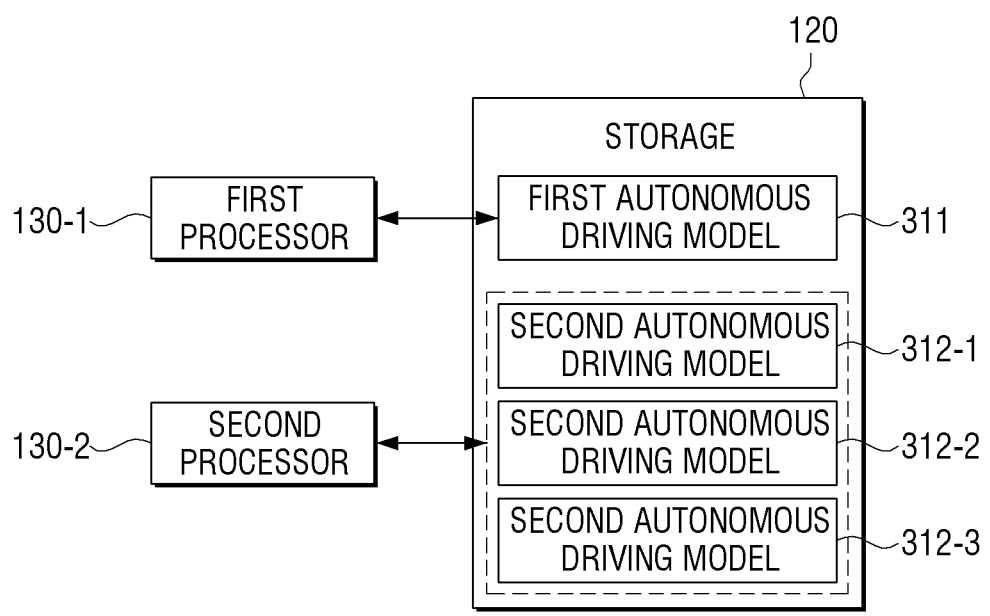
FIG. 4 is a block diagram illustrating an example using an autonomous driving model for autonomous driving of an autonomous driving apparatus according to another example embodiment.
Figure 5:
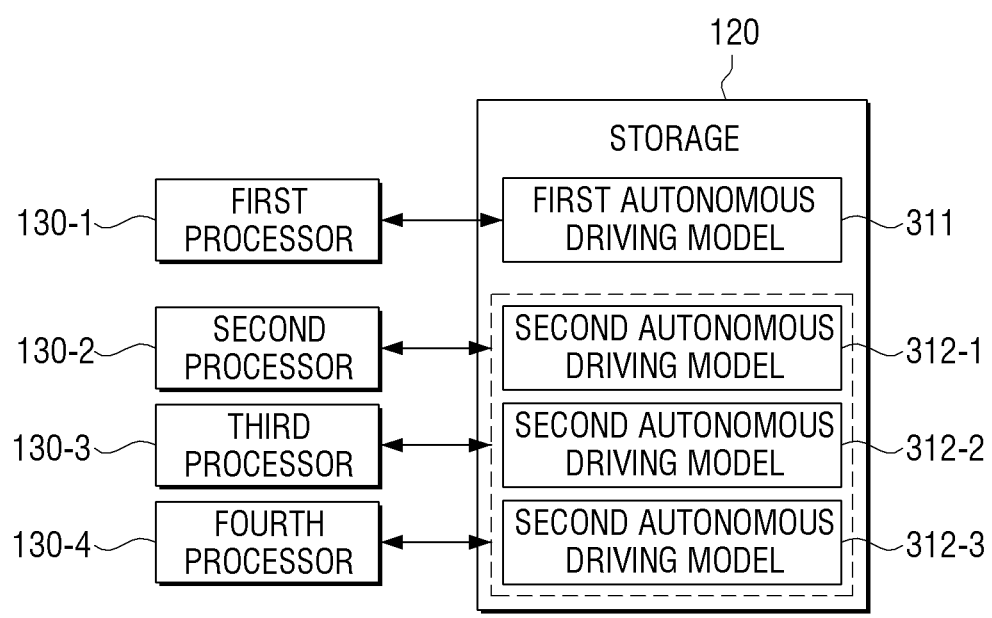
FIG. 5 is a block diagram illustrating an example of using an autonomous driving model for autonomous driving of an autonomous driving apparatus according to still another example embodiment.

From among the plurality of processors 130, the second processor 130-2 (as shown in FIGS. 4 and 5), while the vehicle 10 performs autonomous driving by the first processor 130-1, determines whether or not an event occurs based on sensing information sensed through the sensor 110. As a result of determination, if it is determined that an event has occurred, the second processor 130-2 performs autonomous driving of the vehicle 10 using the second autonomous driving model corresponding the determined event from among the at least one second autonomous driving model.

The first processor 130-1, while the vehicle 10 performs autonomous driving by the second processor 130-2, analyzes sensing information sensed through the sensor 110 and determines whether the vehicle 10 is driving in a normal driving state. If it is determined that the vehicle is driving in a normal driving state, the first processor 130-1 may perform autonomous driving of the vehicle 10 using the first autonomous driving model.

The first processor 130-1 analyzes the sensed information sensed by the sensor 110 while the vehicle 10 performs autonomous driving by the second processor 130-2 and determines that another event different from the event related to the second autonomic driving model being used by the second processor 130-2 has occurred. In this case, the first processor 130-1 can perform the autonomous driving of the vehicle 10 using one of the at least one second autonomic driving model corresponding to another event.

For example, the second processor 130-2, using the second autonomous driving model corresponding to the first event, from among the plurality of events, may perform autonomous driving of the vehicle 10.

While the vehicle 10 is autonomously driving using the second autonomous driving model, the first processor 130-1 may analyze the sensing information sensed by the sensor 110 and determine whether the vehicle 10 is driving in a normal driving state or whether a second even which is different from the first event has occurred.

As a result of determination, if it is determined that the vehicle 10 is driving with a normal driving state, the first processor 130-1 may perform autonomous driving of the vehicle 10 using the first autonomous driving model.

If it is determined that a second event which is different from the first event has occurred, the first processor 130-1 may perform autonomous driving of the vehicle 10 using the second autonomous driving model corresponding to the second event from among at least one second autonomous driving models.

As described above, when there are a plurality of the processors 130, the processors may, for example, be implemented in a number corresponding to each of the plurality of autonomous driving models.

Hereinafter, an operation will be described in greater detail using one of the plurality of autonomous driving models in the at least one process 130 according to the present disclosure.

Figure 3:
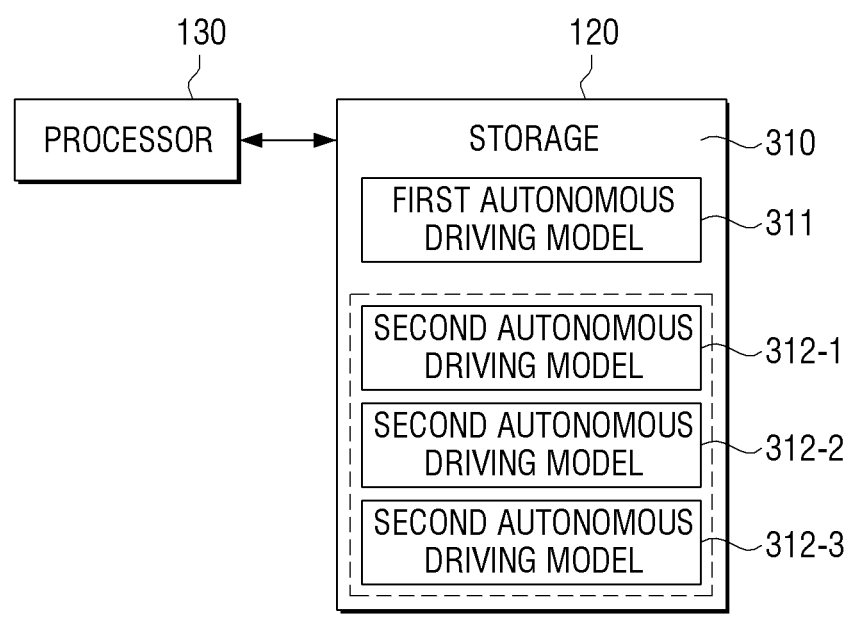
FIG. 3 is a block diagram illustrating an example of using an autonomous driving model for autonomous driving of an autonomous driving apparatus according to an example embodiment.

FIG. 3 is a diagram illustrating an example of using an autonomous driving model for autonomous driving of an autonomous driving apparatus according to an example embodiment.

As illustrated in FIG. 3, the processor 130 performs autonomous driving of the vehicle 10 using one of the plurality of autonomous driving models 310 according to a driving state of the vehicle 10.

The plurality of autonomous driving models 310 includes, for example, a first autonomous driving model 311 which is learned to autonomously drive in a normal driving state and a second autonomous driving models 312-1-312-3 learned to autonomously drive in response to each of an event state.

For example, when driving of the vehicle 10 begins, the processor 130 may perform autonomous driving of the vehicle 10 using the first autonomous driving model 311 which is learned to autonomously drive in a normal driving state.

While the autonomous driving of the vehicle 10 is performed using the first autonomous driving model 311, the processor 130 determines whether an event has occurred based on sensing information sensed by the sensor 110. If it is determined that an event has occurred, the processor 130 performs autonomous driving of the vehicle 10 using one of the second autonomous driving models corresponding to the predetermined event state from among the second autonomous driving models 312-1-312-3 learned to autonomously drive in response to each of the event situation.

For example, while the autonomous driving of the vehicle 10 is being performed using the first autonomous driving model 311, if it is sensed that a vehicle accident has occurred, autonomous driving of the vehicle 10 can be performed using the second autonomous driving model 312-1 learned to autonomously drive in response a vehicle-accident related event.

Therefore, the vehicle 10, which is driving at a speed of 60 Km per hour by the first autonomous driving model 311, may, for example, drive a section where a vehicle accident occurs at a speed lower than the current speed by the second autonomous driving model 312-1.

In another example, while the autonomous driving of the vehicle 10 is performed using the first autonomous driving model 311, when an event of raining is sensed, autonomous driving of the vehicle 10 can be performed using the second autonomous driving model 312-2 which is learned to autonomously drive in response to the corresponding event.

Accordingly, the vehicle 10 which is driving at a speed of 60 Km per hour by the first autonomous driving model 311 may drive at a speed which is lower than the current speed by the second autonomous driving model 312-1.

As still another example, the processor 130, while autonomous driving of the vehicle 10 is being performed using the first autonomous driving model 311, if an event that an abnormality occurs to a driver is sensed, may perform autonomous driving of the vehicle 10 using the second autonomous driving model 312-3 which is learned to autonomously drive in response to the corresponding event.

Therefore, the vehicle 10, which is driving at a speed of 60 Km per hour by the first autonomous driving model 311, may autonomously drive to a hospital which is located at a place mostly adjacent to the vehicle 10 by the second autonomous driving model 312-2.

The processor 130, as the aforementioned example, while the autonomous driving of the vehicle 10 is being performed using one of a determined event from among the second autonomous driving models 312-2-312-3, performs autonomous driving of the vehicle 10 using the first autonomous driving model 311.

FIG. 4 is a diagram illustrating an example of using an autonomous driving model for autonomous driving of an autonomous driving apparatus according to another example embodiment.

As illustrated in FIG. 4, the processor 130 may include a first processor 130-1 and a second processor 130-2.

The first processor 130-1 performs autonomous driving of the vehicle 10 using the first autonomous driving model 311 which is learned to autonomously drive in a normal driving state.

In addition, the second processor 130-2 performs autonomous driving of the vehicle 10 using one of the second autonomous driving models 312-1-312-3 which are learned to autonomously drive in response to each of the events.

For example, when the engine of the vehicle 10 is started and power is supplied to the autonomous driving apparatus 100, the first processor 130-1 may perform autonomous driving of the vehicle 10 using the first autonomous driving model 311 which is learned to autonomously drive in a normal driving state.

As described above, while the first processor 130-1 performs the autonomous driving of the vehicle 10 using the first autonomous driving model 311, the second processor 130-2 determines whether an event has occurred using sensing information sensed through the sensor 110. As a result of determination, if it is determined that an event has occurred, the second processor 130-2 performs autonomous driving of the vehicle 10 using a second autonomous driving model corresponding to a predetermined event state from among the second autonomous driving models 312-1-312-3 learned to autonomously drive in response to each of the events.

For example, while the autonomous driving of the vehicle 10 is being performed using the first autonomous driving model 311 by the first processor 130-1, if it is sensed that a vehicle accident has occurred, the second processor 130-2 may perform autonomous driving of the vehicle 10 using the second autonomous driving model 312-1 learned to autonomously drive in response a vehicle-accident related event.

Therefore, the vehicle 10, which is driving at a speed of 60 Km per hour by the first autonomous driving model 311, may drive on a section where a vehicle accident occurs at a speed lower than the current speed by the second autonomous driving model 312-1.

In another example, while the first processor 130-1 performs the autonomous driving of the vehicle 10 using the first autonomous driving model 311, when the rainy event is detected, the autonomous driving of the vehicle 10 can be performed using the second autonomous driving model 312-2 learned to autonomously drive in response to the event.

Therefore, the vehicle 10, which is driving at a speed of 60 Km per hour by the first autonomous driving model 311, may drive a section where a vehicle accident occurs at a speed lower than the current speed by the second autonomous driving model 312-2.

As still another example, the second processor 130-2, while autonomous driving of the vehicle 10 is being performed using the first autonomous driving model 311 in the first processor 130-1, if an event that an abnormality occurs to a driver is sensed, may perform autonomous driving of the vehicle 10 using the second autonomous driving model 312-3 which is learned to autonomously drive in response to the corresponding event.

Therefore, the vehicle 10 driving at a speed of 60 Km per hour driven by the first autonomous mode 311 can be automatically driven to a hospital located closest to the vehicle 10 by the second autonomous driving model 312-3.

The first processor 130-1 can perform autonomous driving of the vehicle 10 using the first autonomous driving model 311, if it is determined that the vehicle is in the general autonomous state based on the sensing information sensed by the sensor 110 during the autonomous driving of the vehicle 10.

FIG. 5 is a diagram illustrating an example of using an autonomous driving model for autonomous driving of an autonomous driving apparatus according to still another example embodiment.

As illustrated in FIG. 5, the processor 130 may include first to fourth processors 130-1~130-4.

In this example, the first processor 130-1 performs autonomous driving of the vehicle 10 using the first autonomous driving model 311 learned to autonomously driving in a normal driving situation.

The second processor 130-2 performs autonomous driving of the vehicle 10 using the second autonomous driving model 312-1 which is learned to autonomously drive in response to a first event from among a plurality of events.

The third processor 130-3 performs autonomous driving of the vehicle 10 using the second autonomous driving model 312-2 which is learned to autonomously drive in response to a second event from among a plurality of events.

The fourth processor 130-4 performs autonomous driving of the vehicle 10 using the second autonomous driving model 312-3 which is learned to autonomously drive in response to a third event from among a plurality of events.

For example, when the engine of the vehicle 10 is started and power is supplied to the autonomous driving apparatus 100, the first processor 130-1 may perform autonomous driving of the vehicle 10 using the first autonomous driving model 311 which is learned to autonomously drive in a normal driving state.

While the first processor 130-1 performs the autonomous driving of the vehicle 10 using the first autonomous driving model 311, if it is determined that the first event has occurred based on the sensing information detected by the sensor 110, the second processor 130-2 performs autonomous driving of the vehicle 10 using the second autonomous driving model 312-1 which is learned to automatically drive in response to a first event state.

For example, a first event may be an event related to a vehicle accident.

Accordingly, when the first processor 130-1 performs autonomous driving of the vehicle 10 using the first autonomous driving model 311, if it is determined that the first event of a vehicle accident occurs, the second processor 130-2 may perform autonomous driving of the vehicle 10 using the second autonomous driving model 312-1 which is learned to autonomously drive in response to the first event.

Therefore, the vehicle 10, which is driving at a speed of 60 Km per hour by the first autonomous driving model 311, can drive on a section where the vehicle accident occurs at a speed which is lower than a current speed by the second autonomous driving model 312-1.

The second event may be an event related to weather.

Therefore, when the first processor 130-1 determines that the second event of the raining has occurred while the autonomous driving of the vehicle 10 is being performed using the first autonomous driving model 311, the processor 130-3 can perform autonomous driving of the vehicle 10 using the second autonomous driving model 312-2 learned to autonomously drive in response to the second event.

Accordingly, the vehicle 10 which is driving at a speed of 60 Km per hour by the first autonomous driving model 311 can be driving at a speed per hour which is lower than the present speed by the second autonomous driving model 312-2.

The third event may be an event related to contingency event of a driver.

Therefore, while the first processor 130-1 performs the autonomous driving of the vehicle 10 using the first autonomous driving model 311, if it is determined that the third event in which the driver has an abnormality occurs, a fourth processor 130-4 can perform the autonomous driving of the vehicle 10 using the second autonomous driving model 312-3 learned to autonomously drive in response to the third event.

Therefore, the vehicle 10, which is driving at a speed of 60 Km per hour by the first autonomous driving model 311 can perform autonomous driving to a hospital located at a place which is mostly adjacent to the vehicle 10 by the second autonomous driving model 312-3.

Meanwhile, while the first processor 130-1 performs autonomous driving of the vehicle 10 using one of the second autonomous driving models 312-1 through 312-3, it is determined that the vehicle is in the general autonomous driving situation based on the sensing information sensed through the first autonomous driving model 311.

Meanwhile, the predetermined first processor 130-1 of the first to fourth processors 130-1 to 130-4 may determine whether an event has occurred based on sensing information sensed by the sensor 110.

Thereafter, the first processor 130-1 transmits event occurrence information to the processor 130-2 to 130-4 using the second autonomous driving model 312 which is learned to autonomously drive in response to a predetermined event from among the second to fourth processors 130-2 to 130-4.

Accordingly, the processor which receives the event occurrence information among the second to fourth processors 130-2 to 130-4, may perform autonomous driving of the vehicle 10 using the second autonomous driving model 312 which is learned to autonomously drive in response to the corresponding event.

However, the present disclosure is not limited thereto, and each of the first to fourth processors 130-1 to 130-4 may determine whether an event has occurred based on sensing information sensed through the sensor 110.

In this case, when it is determined that an event has occurred, the processor related to the previously determined event among the first to fourth processors 130-1 to 130-4 may perform autonomous driving of the vehicle 10 which is learned to automatically drive in response to the corresponding event.

Figure 6:
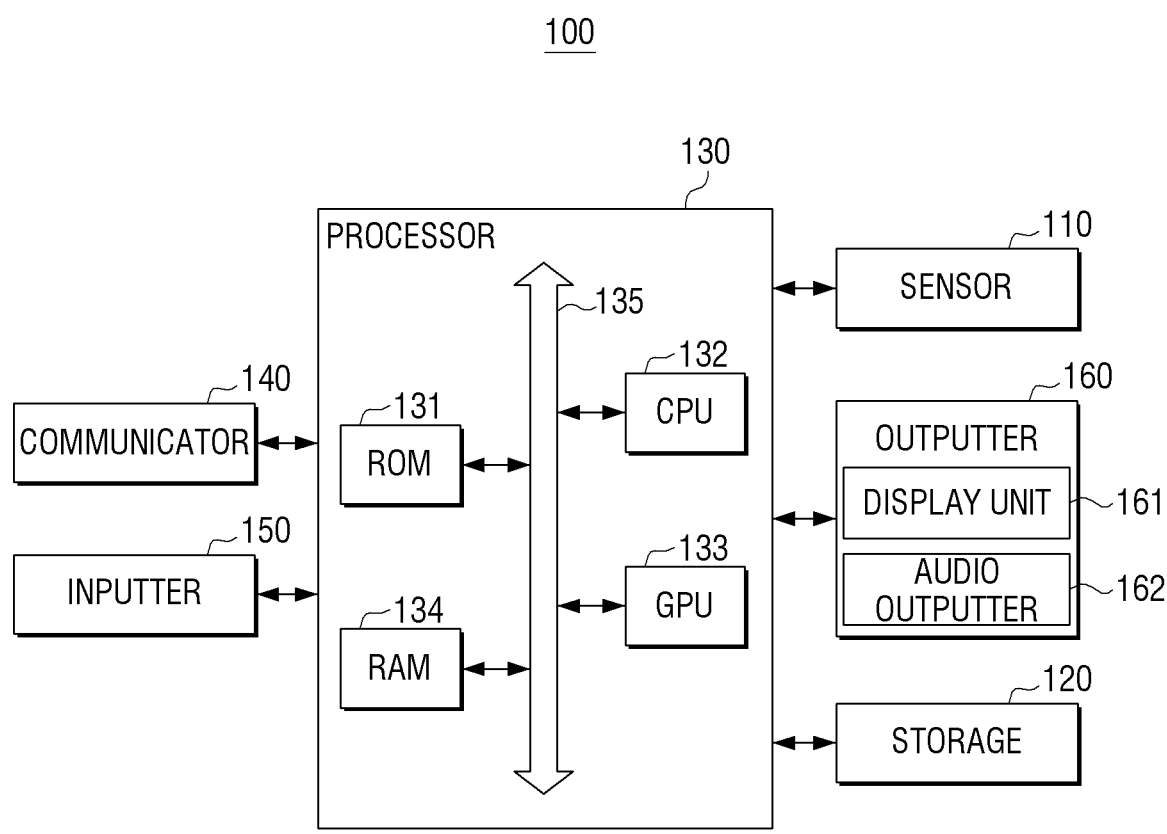
FIG. 6 is a block diagram illustrating an autonomous driving apparatus according to an example embodiment.

FIG. 6 is a block diagram illustrating an example autonomous driving apparatus according to an example embodiment.

As illustrated in FIG. 6, the automatic driving apparatus 100 may further include a communicator (e.g., including communication circuitry) 140, an inputter (e.g., including input circuitry) 150, and an outputter (e.g., including output circuitry) 160, in addition to the sensor 110, the storage 120, and the processor 130.

As described above, the sensor 110 for acquiring the sensing information for determining the driving state of the vehicle 10 may include, for example, and without limitation, an accelerometer sensor, a gyro sensor, a proximity sensor, temperature and air quality detection sensors, airbag sensors, tire air pressure sensors, impact sensors, cameras, and the like.

However, the present disclosure is not limited thereto, and the sensor 110 may further include a geomagnetic sensor for sensing the position of the vehicle 10, a gravity sensor, and a lane departure detection sensors for sensing lane departure, and the like.

The accelerometer sensor is a sensor for measuring the acceleration or impact of the moving vehicle 10, and the gyroscope sensor is a sensor which recognizes the six-axis direction by rotating the accelerometer sensor, to recognize more detailed and precise operation.

The proximity sensor is a sensor for detecting the proximity of a vehicle 20 in the vicinity of the driving vehicle 10. The temperature and air quality detection sensor is a sensor for measuring the temperature inside the vehicle 10 and the carbon dioxide concentration.

The airbag sensor is a sensor for detecting whether the airbag is operated to protect the driver's body from a collision accident of the vehicle 10. The tire air pressure sensor measures and detects the supply pressure state of the tire of the vehicle 10. The camera is a sensor for photographing a driver who has boarded the vehicle 10.

The geomagnetic sensor is a sensor for detecting the position of the vehicle 10. The gravity sensor is a sensor for detecting the direction of the vehicle 10 by detecting the direction of gravity acting on the vehicle 10, and the lane departure detection sensor is a sensor for detecting whether the driving vehicle 10 normally drives without leaving the lane. The impact sensor is a sensor for detecting the impact strength of the vehicle. The presence or absence of the operation of the airbag can be determined according to the detected impact intensity through the impact sensor.

The sensor 110 according to the present disclosure may sense various state information through a sensor which can sense a state of the vehicle 10 and a state of a driver or a passenger getting in the vehicle 10.

The storage 120, as described above, may further store various operation programs to control operations of the autonomous driving apparatus 100, in addition to storing a plurality of autonomous driving models.

When the autonomous driving apparatus 10) is turned on, the operating program may be a program that is read in the storage 120, compiles and operates each configuration of the autonomous driving apparatus 100. The storage 120 may, for example, and without limitation, be implemented as at least one of a ROM 131, a RAM 134 or a memory card (e.g., an SD card or a memory stick) that can be attached to or detached from the autonomous driving apparatus 100, a non-volatile memory, a volatile memory, a hard disk drive (HDD), a solid state drive (SSD), or the like.

The processor 130 may include various processing circuitry and control the overall operation of the autonomous driving apparatus 100 or may be a processing device which controls the overall operation of the autonomous driving apparatus 100 as described above.

The processor 130 may include the CPU 132, the ROM 131, the RAM 134, and the GPU 133, and the CPU 132, ROM 131, RAM 134, and GPU 133 may be interconnected through a bus 135.

The CPU 132 accesses the storage 120 and performs booting using an operating system program stored in the storage 120. In addition, the CPU 132 performs various operations using various programs, contents, and data stored in the storage 120.

The ROM 131 stores a command set for booting the system and the like. When the turn-on command is input and power is supplied, the CPU 133 copies the OS stored in the storage 120 to the RAM 134 according to a command stored in the ROM 131, and executes the OS to boot the system. When the booting is completed, the CPU 133 copies various programs stored in the storage 120 to the RAM 134, executes the program copied to the RAM 134, and performs various operations.

The GPU 133 generates a display screen including various objects such as icons, images, text, and the like. Specifically, the GPU 133 calculates an attribute value such as a coordinate value, a shape, a size, and a color to be displayed by each object according to the layout of the screen based on the received control command, and generates display screens of various layouts including objects based on the calculated attribute value.

The processor 130 may be implemented as a system-on-a-chip or system on chip (SOC, SoC) combined with the aforementioned sensor 110, storage 120, or each configuration to be described later.

The communicator 140 may include various communication circuitry and communicates with a device included in the vehicle 10, a user terminal device of a driver or a passenger, an autonomous driving apparatus 100 of the peripheral vehicle 10, and a traffic management server (not shown), etc. Here, the device included in the vehicle 10 may, for example, and without limitation, include a driving recorder (not shown) such as a black box, and a traffic management server (not shown) may include a cloud server (not shown) storing traffic accident related information and an organization server (not shown) in charge of incident handling.

The communicator 140 may include various communication circuitry and be implemented as a communication module such as a short-range communication module (not shown) and a wireless communication module (not shown), and so on.

Here, the short-range communication module (not shown) is a communication module that performs wireless communication with a driving recorder (not shown) mounted in the vehicle 10 and a user terminal (not shown) of a driver or a passenger. For example, the module can be Bluetooth, Zigbee, Near Field Communication (NFC), etc.

The wireless communication module (not shown) is connected to a mobile communication network according to various mobile communication standards such as WiFi, 3rd Generation (3G), 3rd Generation Partnership Project (3GPP) and Long Term Evolution (LTE) and so on, and can communicate with the autonomous driving vehicle 100 of the peripheral vehicle 10 and the traffic management server (not shown).

In addition, the communicator 140 may transmit contents stored in an external recording medium or transmit to the external recording medium from the external recording medium physically connected to the autonomous driving apparatus 100 through a connector (not shown) which provides interface with various source devices such as USB 2.0, USB 3.0, HDMI, IEEE 1394. In addition, the communicator 140 may receive power through the connector (not shown).

An inputter 150 may include various input circuitry for receiving various user commands from a driver or a passenger and transmitting the command to the processor 130.

The inputter 150 may include, for example, and without limitation, a microphone, a manipulation unit, a touch input, and a user input.

The microphone receives a voice command of the user and the manipulation unit may be implemented as a keypad having various function keys, numeric keys, special keys, character keys, and the like. When the display unit 161 included in the output unit 160 to be described later is implemented as a touch screen, the touch inputter may be implemented as a touch pad having a mutual layout structure with the display unit 161. In this case, the touch inputter may receive a selection command for various application-related icons displayed through the display unit 161.

The user inputter may receive an IR signal or an RF signal for controlling an operation of the autonomous driving apparatus 100 from at least one peripheral device (not shown) such as a remote control device.

The outputter 160 may include various output circuitry including, for example, and without limitation, a display unit (e.g., including a display) 161 that outputs an image of the content and an audio outputter 162 including various audio output circuitry that outputs audio of the content. In addition, when the autonomous driving model is changed, the outputter 160 outputs a message for guiding the change of the autonomous driving mode through at least one of the display unit 161 and the audio outputter 162.

Hereinbelow, an operation of performing autonomous driving of the vehicle 10 through a plurality of processors in the autonomous driving apparatus 100 will be described in greater detail.

Figure 7:
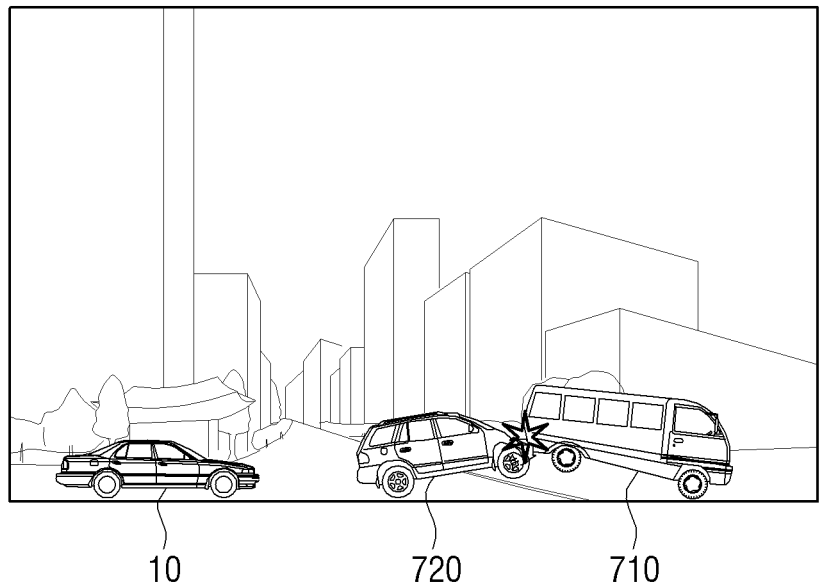
FIG. 7 is a diagram illustrating performing autonomous driving of a vehicle in response to an event of an autonomous driving apparatus according to an example embodiment.

FIG. 7 is a diagram illustrating an example of performing autonomous driving of a vehicle in response to an event of an autonomous driving apparatus according to an example embodiment.

As shown in FIG. 7, among the plurality of processors of the autonomous driving apparatus 100, the first processor 130-1 performs autonomous driving of the vehicle 10 using the first autonomous driving model, from among a plurality of autonomous driving models, which is learned to autonomously drive in a normal driving state.

While autonomous driving of the vehicle 10 is performed using the first autonomous driving model, the second processor 130-2 determines whether an event has occurred based on sensing information sensed through the sensor 110.

However, the present disclosure is not limited thereto, and the second processor 130-2 may determine whether an event has occurred based on sensing information sensed by the sensor 110 and information received from the peripheral vehicle 10, traffic management server (not shown) which manages traffic on roads, and a meteorological administration server (not shown) through the communicator 140.

As a result of the determination, if it is determined that an event occurs in which an accident occurs between the adjacent vehicles 710 and 720 on the road on which the vehicle 10 is driving, the second processor 130-2 performs autonomous driving of the vehicle 10 using the second autonomous driving model which is learned to autonomously drive in response to a vehicle accident-related event.

As described above, the autonomous driving apparatus 100 according to the present disclosure performs the autonomous driving of the vehicle 10 using the learned autonomous driving model corresponding to each event through the plurality of processors. Accordingly, the autonomous driving apparatus 100 according to the present disclosure can perform the autonomous driving of the vehicle 10 to pass the area where the traffic accident occurred, more quickly and safely when the traffic accident related event occurs during the normal driving.

Figure 8A:
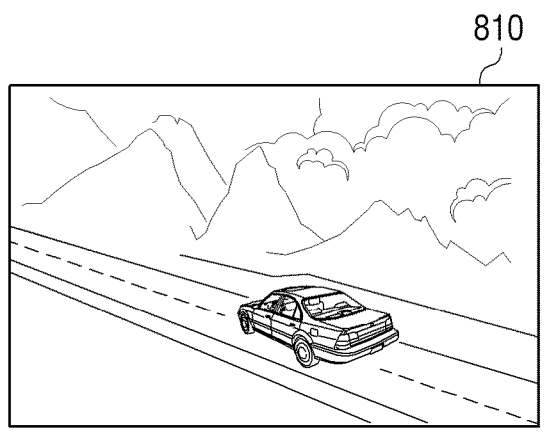
FIGS. 8A and 8B are diagrams illustrating performing autonomous driving of a vehicle in response to an event of an autonomous driving apparatus according to still another example embodiment.
Figure 8B:
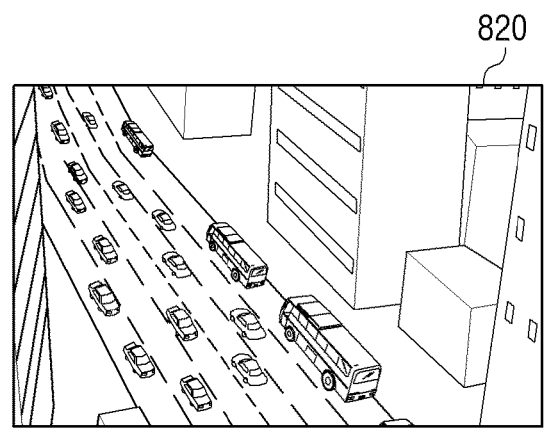

FIGS. 8A and 8B are diagrams illustrating an example of performing autonomous driving of a vehicle in response to an event of an autonomous driving apparatus according to another example embodiment.

The first processor 130-1 of the plurality of processors 130 of the autonomous driving apparatus 100 uses the first autonomous driving model learned to autonomously drive in a normal driving situation among a plurality of autonomous driving models to perform autonomous driving of the vehicle 10.

While autonomous driving of the vehicle 10 is performed by using the first autonomous driving model, the second processor 130-2 determines whether an event has occurred based on sensing information which is sensed by the sensor 110.

However, the present disclosure is not limited thereto, and the second processor 130-2 may determine whether an event has occurred based on sensing information sensed by the sensor 110 and information received from the peripheral vehicle 10, traffic management server (not shown) which manages traffic on roads, and a meteorological administration server (not shown) through the communicator 140.

As a result of the determination, if it is determined that the event that the driving vehicle 10 enters the highway 810 in which a vehicle is capable of high-speed driving, as illustrated in FIG. 8A, the second processor 130-2 performs autonomous driving of the vehicle 10 using the second autonomous driving model learned to autonomously drive in response to the corresponding event.

Meanwhile, during the autonomous driving of the vehicle 10 using the second autonomous driving model that is learned to autonomously drive in response to the event entering the highway 810, the first processor 130-1 or a third processor 130-3 determines whether an event occurs based on the sensing information sensed through the sensor 110.

However, the present disclosure is not limited thereto, and the third processor 130-3 may determine whether an event has occurred based on sensing information sensed by the sensor 110 and information received from the peripheral vehicle 10, a traffic management server (not shown) which manages traffic on roads, and a meteorological administration server (not shown) through the communicator 140.

As a result of the determination, if it is determined that the event that the driving vehicle 10 enters a road 820 of the congested traffic road, as shown in FIG. 8B, the first or third processors 130-1 or 130-3 perform autonomous driving of the vehicle 10 using the second autonomous driving model learned to autonomously drive in response to the event.

As described above, the autonomous driving apparatus 100 according to the present disclosure performs autonomous driving of the vehicle 10 using the learned autonomous driving model corresponding to each event through the plurality of processors. Therefore, the autonomous driving apparatus 100 according to the present disclosure can perform the autonomous driving of the vehicle 10 in a driving mode suitable for highway, general road, congested road, etc.

Figure 9:
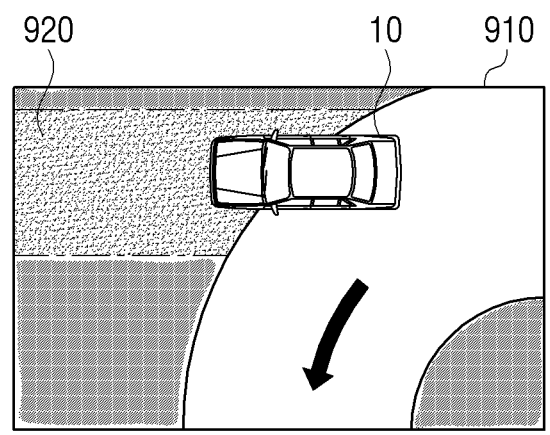
FIG. 9 is a diagram illustrating performing autonomous driving of a vehicle in response to an event of an autonomous driving apparatus according to another example embodiment.

FIG. 9 is a diagram illustrating an example of performing autonomous driving of a vehicle in response to an event of an autonomous driving apparatus according to still another example embodiment.

As shown in FIG. 9, the first processor 130-1 among the plurality of processors 130 of the autonomous driving apparatus 100 learns to autonomously drive in a normal driving situation among a plurality of autonomous driving models and performs the autonomous driving of the vehicle 10 using the first autonomous driving model.

While the autonomous driving of the vehicle 10 is performed using the first autonomous driving model, the second processor 130-2 determines whether an event has occurred based on sensing information sensed through the sensor 110.

However, the present disclosure is not limited thereto, and the second processor 130-2 may determine whether an event has occurred based on sensing information sensed through the sensor 110 and information received from the peripheral vehicle 10, traffic management server (not shown) which manages traffic on roads, and a meteorological administration server (not shown) through the communicator 140.

As a result of the determination, when it is determined that an event occurs that a vehicle drives on a driving route different from the driving route on which the vehicle is driving, the second processor 130-2 performs autonomous driving of the vehicle 10 using the second autonomous driving model which is learned to autonomously drive in response to the corresponding event, from among a plurality of autonomous driving models.

For example, the vehicle 10, according to a control command for autonomous driving of the first processor 130-1, may drive on a driving route corresponding to a destination requested by a user.

Meanwhile, as shown in the figure, the vehicle 10 can be driven on a road 920 different from the corresponding road 910 by leaving the road 910 on the driving route corresponding to the destination requested by the user.

For example, when a system error occurs in the first processor 130-1 performing the autonomous driving of the vehicle 10 using the first autonomous driving model, the vehicle 10 may depart from the road 910 on the driving route corresponding to the destination and drive on the road 920 different from the corresponding road 910.

When such a system error related event occurs, the second processor 130-2 uses the second autonomous driving model learned to autonomously drive in response to the system error related event among the plurality of autonomous driving models and performs autonomous driving of the vehicle 10.

As described above, the autonomous driving apparatus 100 according to the present disclosure performs the autonomous driving of the vehicle 10 using the learned autonomous driving model corresponding to each event through the plurality of processors 130. Therefore, the autonomous driving apparatus 100 according to the present disclosure can perform the autonomous driving of the vehicle 10 so that even if an error occurs in the system for autonomous driving, the mobile terminal 10 moves to the destination requested by the user.

Figure 10:
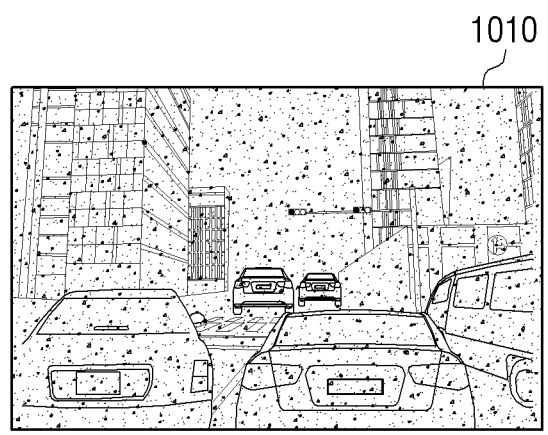
FIG. 10 is a diagram illustrating performing autonomous driving of a vehicle in response to an event of an autonomous driving apparatus according to still another example embodiment.

FIG. 10 is a diagram illustrating an example of performing autonomous driving of a vehicle in response to an event of an autonomous driving apparatus according to still another example embodiment.

As shown in FIG. 10, the first processor 130-1 among the plurality of processors 130 of the autonomous driving apparatus 100 uses the first autonomous driving model which is learned to autonomously learn in a normal driving state and performs the autonomous driving of the vehicle 10 using the first autonomous driving model.

Meanwhile, while the autonomous driving of the vehicle 10 is performed using the first autonomous driving model, the second processor 130-2 determines whether an event has occurred based on sensing information sensed through the sensor 110.

However, the present disclosure is not limited thereto, and the second processor 130-2 may determine whether an event has occurred based on sensing information sensed through the sensor 110 and information received from the peripheral vehicle 10, traffic management server (not shown) which manages traffic on roads, and a meteorological administration server (not shown) through the communicator 140.

As a result of the determination, when it is determined that an event in which a vehicle drives on a snowy road 1010 occurs, the second processor 130-2 performs autonomous driving of the vehicle 10 using the second autonomous driving model which is learned to autonomously drive in response to the event from among a plurality of autonomous driving models.

As described above, the autonomous driving apparatus 100 according to the present disclosure performs the autonomous driving of the vehicle 10 using the learned autonomous driving model corresponding to each event through the plurality of processors. Accordingly, the autonomous driving apparatus 100 performs the autonomous driving of the vehicle 10 in a running mode suitable for the weather change even when the snowing or raining weather changes during the autonomous driving of the vehicle 10, and may minimize and/or reduce traffic accidents due to weather changes.

Hereinabove, the operation of performing the autonomous driving of the vehicle 10 using the plurality of autonomous driving models in the autonomous driving apparatus 100 according to the present disclosure has been described in detail. Hereinafter, a method of performing the autonomous driving of the vehicle 10 using a plurality of autonomous driving models in the autonomous driving apparatus 100 according to the present disclosure will be described in greater detail.

Figure 11:
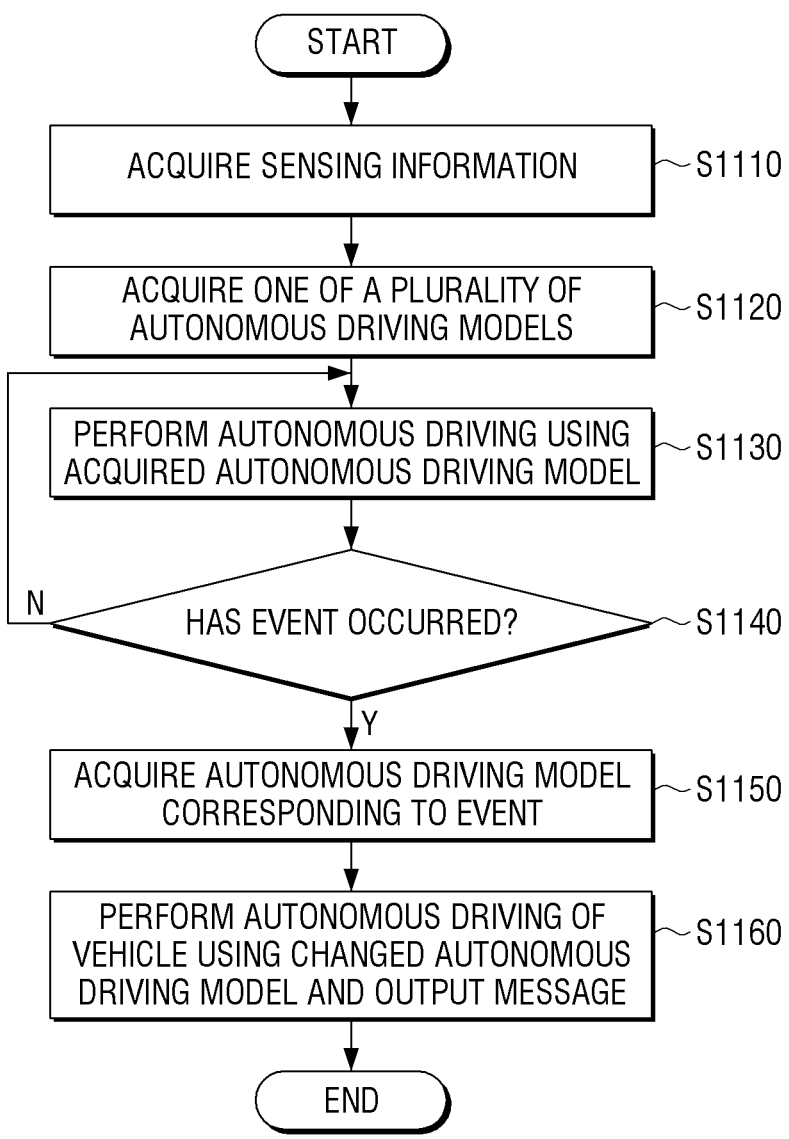
FIG. 11 is a flowchart illustrating a controlling method of an autonomous driving apparatus according to an example embodiment.

FIG. 11 is a flowchart illustrating a controlling method of an autonomous driving apparatus according to an example embodiment.

As illustrated in FIG. 11, the autonomous driving apparatus 100 obtains (acquires) sensing information to determine a driving state of the vehicle 10 in step S1110.

The sensing information for determining the driving state of the vehicle 10 may include state information of the vehicle 10 and state information related to the road on which the vehicle 10 is driving.

The state information of the vehicle 10 may include, for example, and without limitation, air pressure information, vibration intensity information, acceleration information, photographing information, infrared rays sensing information, position information of the vehicle 10, or the like.

In addition, the state information of the vehicle 10 may include system information of the autonomous driving apparatus 100 that the vehicle 10 is controlled to autonomously drive. Here, the system information may include, for example, and without limitation, processing speed information booting information, and so on of the processor 130 that controls the vehicle 10 to autonomously drive.

The state information related to roads on which the vehicle is driving may include information on accidents among vehicles 10, road information, weather information, and the like.

The autonomous driving apparatus 100 may further acquire not only the sensing information for determining the driving state of the vehicle 10, but also current time information, map information, destination information, power supply state information, and the like.

The autonomous driving apparatus 10) acquires one of a plurality of autonomous driving models previously stored based on various information including the above-described sensing information in step S1120.

The autonomous driving apparatus 100 performs autonomous driving of the vehicle 10 using at least one processor using the pre-acquired autonomous driving model in step S1130.

The plurality of autonomous driving models may, for example, include a first autonomous driving model that is learned to autonomously drive in a normal driving situation, and at least one second autonomous driving model that is learned to autonomously drive in response to each of the event situations.

Therefore, when the driving of the vehicle 10 is started, the autonomous driving apparatus 100 can acquire the first autonomous driving model learned to autonomously drive in the normal driving situation among a plurality of autonomous driving models. Thereafter, the autonomous driving apparatus 100 can perform autonomous driving of the vehicle 10 using the acquired first autonomous driving model.

The autonomous driving apparatus 100 determines whether an event has occurred based on various information including the sensing information described above during the autonomous driving of the vehicle 10 using the first autonomous driving model in step S1140.

As a result of the determination, if it is determined that no event has occurred, the autonomous driving apparatus 100 performs autonomous driving of the vehicle 10 using the first autonomous driving model.

If it is determined that an event has occurred, the autonomous driving apparatus 100 acquires a second autonomous driving model which is learned to autonomously drive in response to the event in step S1150.

Thereafter, the autonomous driving apparatus 100 may output a message informing that the autonomous driving mode has been changed from the first autonomous driving model to the second autonomous driving model, and may output to the at least one processor using the changed second autonomous driving model, thereby performing autonomous driving of the vehicle 10 in step S1160.

According to an example embodiment, the autonomous driving apparatus 100 can perform the autonomous driving of the vehicle 10 using the first autonomous driving model through a single processor. During the autonomous driving of the vehicle 10 using the first autonomous driving model, the autonomous driving apparatus 100 analyzes the sensed sensing information to determine whether an event has occurred. If it is determined that an event has occurred, the autonomous driving apparatus 100 can perform the autonomous driving of the vehicle 10 using the second autonomous driving model learned in response to the event through the processor.

According to another example embodiment, the autonomous driving apparatus 100 may perform autonomous driving of the vehicle 10 using the first autonomous driving model through the first processor from among a plurality of processors.

While the vehicle performs autonomous driving by the first processor, the autonomous driving apparatus 100 analyzes the sensed sensing information to determine whether an event has occurred. As a result of the determination, if it is determined that an event has occurred, the autonomous driving apparatus 100 may acquire the second autonomous driving model in response to the event through the second processor from among a plurality of processors, and perform the autonomous driving of the vehicle 10 using the acquired second autonomous driving model.

In the meantime, the autonomous driving apparatus 100 analyzes sensing information sensed during the autonomous driving of the vehicle 10 using the second autonomic driving model through the second processor, and determines whether or not there is an event which is different from the aforementioned event.

As a result of the determination, if it is determined that an event different from the above-described event has occurred, the autonomous driving apparatus 100 acquires another second autonomous driving model learned in response to the event through the first processor, and performs the autonomous driving of the vehicle 10 using another second autonomous driving model.

Meanwhile, when the autonomous driving apparatus 100 determines that the event that the vehicle 10 drives in the normal driving state occurs while the autonomous driving of the vehicle 10 is performed using the second autonomous driving model, it is possible to acquire the first autonomous driving model learned by the first processor to perform the general autonomous driving in accordance with the corresponding event and perform the autonomous driving of the vehicle 10 using the obtained first autonomous driving model.

According to a further aspect of the present disclosure, at least one processor that performs autonomous driving of the vehicle 10 using the autonomous driving model may be implemented in a number corresponding to each of the plurality of autonomous driving models.

In this case, the autonomous driving apparatus 100 may perform autonomous driving of the vehicle 10 using the first autonomous driving model through the first processor from among the plurality of processors.

While the vehicle is performing autonomous driving by the first processor, the autonomous driving apparatus 100 analyzes the sensed sensing information to determine whether an event has occurred. As a result of the determination, if it is determined that an event has occurred, the autonomous driving apparatus 100 acquires the learned second autonomic driving model in response to the event through the second of the plurality of processors, and performs the autonomous driving of the vehicle 10.

Meanwhile, the autonomous driving apparatus 100X) analyzes sensing information sensed during autonomous driving of the vehicle 10 by using the second autonomous driving model through the second processor, and determines whether or not an event which is different from the above-described event has occurred.

As a result of the determination, if it is determined that an event different from the above-described event has occurred, the autonomous driving apparatus 100 acquires another second autonomous driving model learned in response to the event through the third processor, and perform autonomous driving of the vehicle 10 using another second autonomous driving model.

A controlling method of the aforementioned autonomous driving apparatus 100 can be implemented as at least one execution program, and the execution program can be stored in non-transitory computer readable recording medium.

Non-transitory readable medium may be a medium that semi-permanently stores data and can be read by a device. For example, the above-mentioned programs may be stored in a computer-readable recording medium such as a Random Access Memory (RAM), a flash memory, a Read Only Memory (ROM), an Erasable Programmable ROM (EPROM), an Electronically Erasable and Programmable ROM (EEPROM), a register, a hard disk, a removable disk, a memory card, a USB memory, a CD-ROM, or the like.

The present disclosure has been described centering on preferred example embodiments.

The foregoing example embodiments and advantages are merely examples and are not to be understood as limiting. The example embodiments can be readily applied to other types of device or apparatus. Also, the description of the example embodiments is intended to be illustrative, and not to limit the scope of the disclosure, and many alternatives, modifications, and variations will be apparent to those skilled in the art.

What is claimed is:

1. An autonomous driving apparatus configured to perform autonomous driving of a vehicle comprising:
   a sensor configured to acquire sensing information to determine a driving state of the vehicle;
   a memory configured to store a plurality of autonomous driving neural network models comprising a first autonomous driving neural network model configured to autonomously drive in a normal driving status and a plurality of second autonomous driving neural network modes, wherein each of the plurality of second autonomous driving neural network models is associated with a different event situation of a plurality of event situations and is configured to autonomously drive in response to detection of the associated event situation;
   a first processor; and
   a second processor different from the first processor,
   wherein the first processor is configured to perform autonomous driving of the vehicle using the first autonomous driving neural network model corresponding to the normal driving status, and
   wherein the second processor is configured to, while autonomous driving of the vehicle is being performed by the first processor using the first autonomous driving neural network model, analyze the acquired sensing information to detect an event situation and to transition to perform autonomous driving of the vehicle using one neural network model corresponding to the detected event situation among the plurality of second autonomous driving neural network models based on detecting the event situation,
   wherein the first autonomous driving neural network model is trained to autonomously drive in a normal driving status, and each of the plurality of second autonomous driving neural network models is trained to autonomously drive in response to the corresponding event situations,
   wherein while the second processor is configured so that while the vehicle performs autonomous driving by the second processor, the second processor is configured to perform autonomous driving of the vehicle using at least another neural network model corresponding to another event from among the plurality of second autonomous driving neural network models, based on a determination that another event different from the plurality of event situations occurs by analyzing sensing information sensed by the sensor.

2. The autonomous driving apparatus of claim 1, wherein the first processor is configured to perform autonomous driving of the vehicle using the first autonomous driving neural network model when it is determined by analyzing sensing information sensed by the sensor that the vehicle drives in a normal state while the vehicle performs autonomous driving using the second processor.

3. The autonomous driving apparatus of claim 1, wherein the first processor is configured to perform autonomous driving of the vehicle using another neural network model corresponding to another event from among the plurality of second autonomous driving neural network models when it is determined by analyzing sensing information sensed by the sensor that another event different from the plurality of event situations occurs while the vehicle performs autonomous driving by the second processor.

4. The autonomous driving apparatus of claim 1, further comprises additional processors, each of the additional processors is configured to performs autonomous driving of the vehicle using a different neural network model of the plurality of autonomous driving neural network models corresponding to the respective processor.

5. The autonomous driving apparatus of claim 1, wherein the sensing information comprises state information of the vehicle and/or state information related to a road on which the vehicle is driving.

6. The autonomous driving apparatus of claim 1, further comprising:
an outputter comprising output circuitry,
  wherein, the first processor or the second processor is configured to control the outputter to output a message to guide the change of the autonomous driving mode based on the autonomous driving neural network model being changed.

7. The autonomous driving apparatus of claim 1, wherein the detected event situation comprises a system error in the first processor while performing the autonomous driving of the vehicle using the first autonomous driving neural network model.

8. The autonomous driving apparatus of claim 1, wherein the detected event situation comprises a traffic accident occurring while the first processor is performing the autonomous driving of the vehicle using the first autonomous driving neural network model.

9. A controlling method of an autonomous driving apparatus of a vehicle comprising a first processor, a second processor different from the first processor, and a memory configured to store a plurality of autonomous driving neural network models comprising a first autonomous driving neural network model configured to autonomously drive in a normal driving status and plurality of second autonomous driving neural network modes, wherein each of the plurality of second autonomous driving neural network models is associated with a different event situation of a plurality of event situations and is configured to autonomously drive in response to detection of the associated event situation, the method comprising:
  performing autonomous driving of the vehicle using the first autonomous driving neural network model by the first processor,
  acquiring sensing information from a sensor to determine a driving state of the vehicle;
  while autonomous driving of the vehicle is being performed by the first processor using the first autonomous driving neural model corresponding to the normal driving status, analyze the acquired sensing information to determine an event situation by the second processor;
  acquiring one autonomous driving neural network model from among the plurality of second autonomous driving neural network models based on determining occurrence the event situation while autonomous driving of the vehicle is being performed using the first autonomous driving neural network model; and
  while autonomous driving of the vehicle is being performed using the first autonomous driving neural network model, transition to perform autonomous driving of the vehicle, by the second processor, using the acquired second autonomous driving neural network model, of the plurality of second autonomous driving neural network models, based on the sensing information corresponding to the event situation associated with the acquired second autonomous driving neural network model,
  wherein the first autonomous driving neural network model trained to autonomously drive in a normal driving status, and each of the second autonomous driving neural network model is trained to autonomously drive in response to the corresponding event situations,
  wherein the performing autonomous driving further comprises: while the vehicle performs autonomous driving by the second processor, performing autonomous driving of the vehicle using another neural network model corresponding to another event from among the plurality of second autonomous driving neural network models based on it is determined that another event different from the plurality of event situation occurs by analyzing sensing information sensed through the sensor.

10. The method of claim 9, wherein the performing autonomous driving comprises:
  performing autonomous driving of the vehicle using the first autonomous driving neural network model by the first processor when it is determined by analyzing sensing information sensed through the sensor that the vehicle drives in a normal driving status, while the vehicle performs autonomous driving by the second processor.

11. The method of claim 9, wherein the autonomous driving apparatus comprises additional processors, each of the additional processors is configured to performs autonomous driving of the vehicle using a different neural network model of the plurality of autonomous driving neural network models corresponding to the respective processor.

12. The method of claim 9, wherein the sensing information comprises state information of the vehicle and/or state information related to a road on which the vehicle is driving.

13. The method of claim 9, further comprising:
  outputting a message to guide the change of the autonomous driving mode based on an autonomous driving neural network model being changed.

* * * * *